Aug. 7, 1928.
F. R. MAW
1,679,939
BOTTLE ADVANCING MECHANISM
Filed Feb. 6, 1924
8 Sheets-Sheet 1
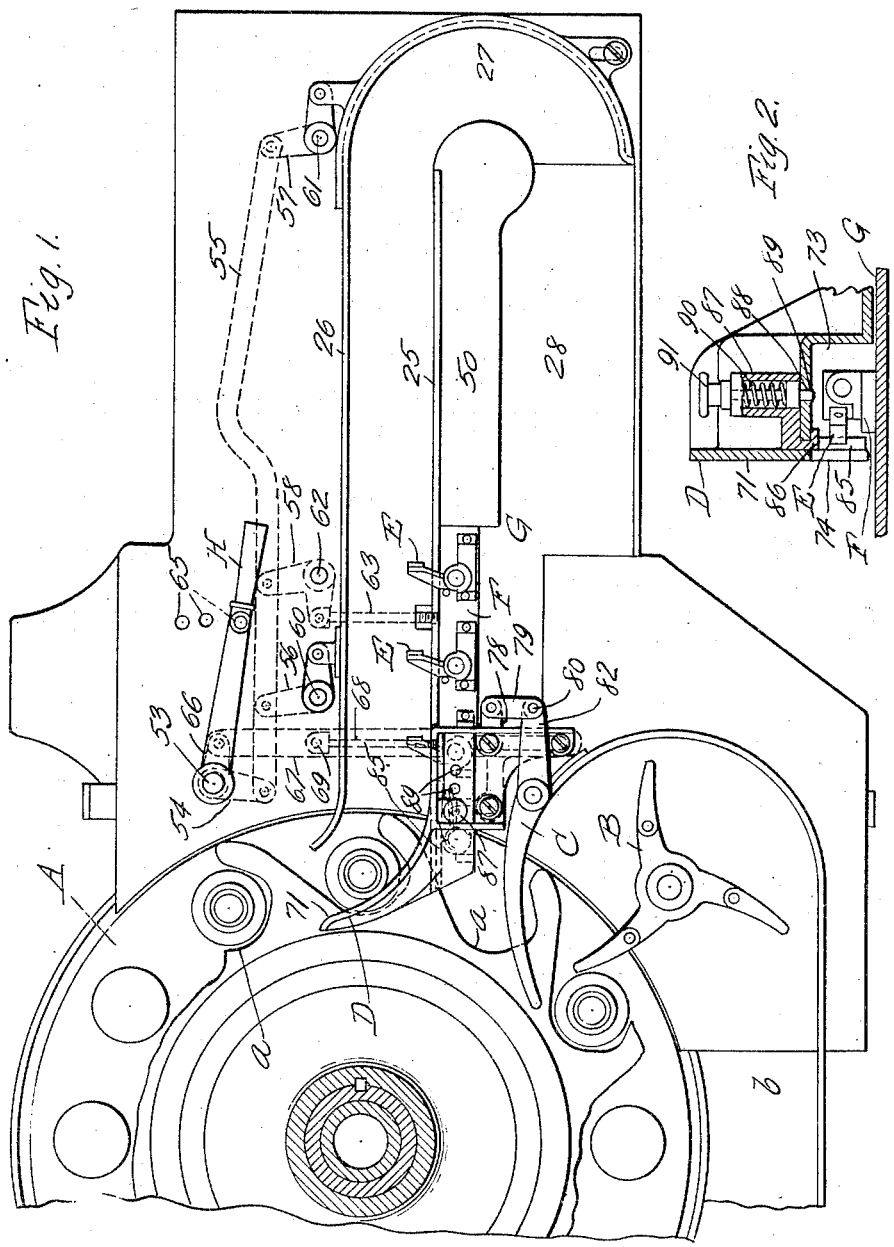
INVENTOR.
Francis R. Maw
by Parker & Mockrow.
ATTORNEYS

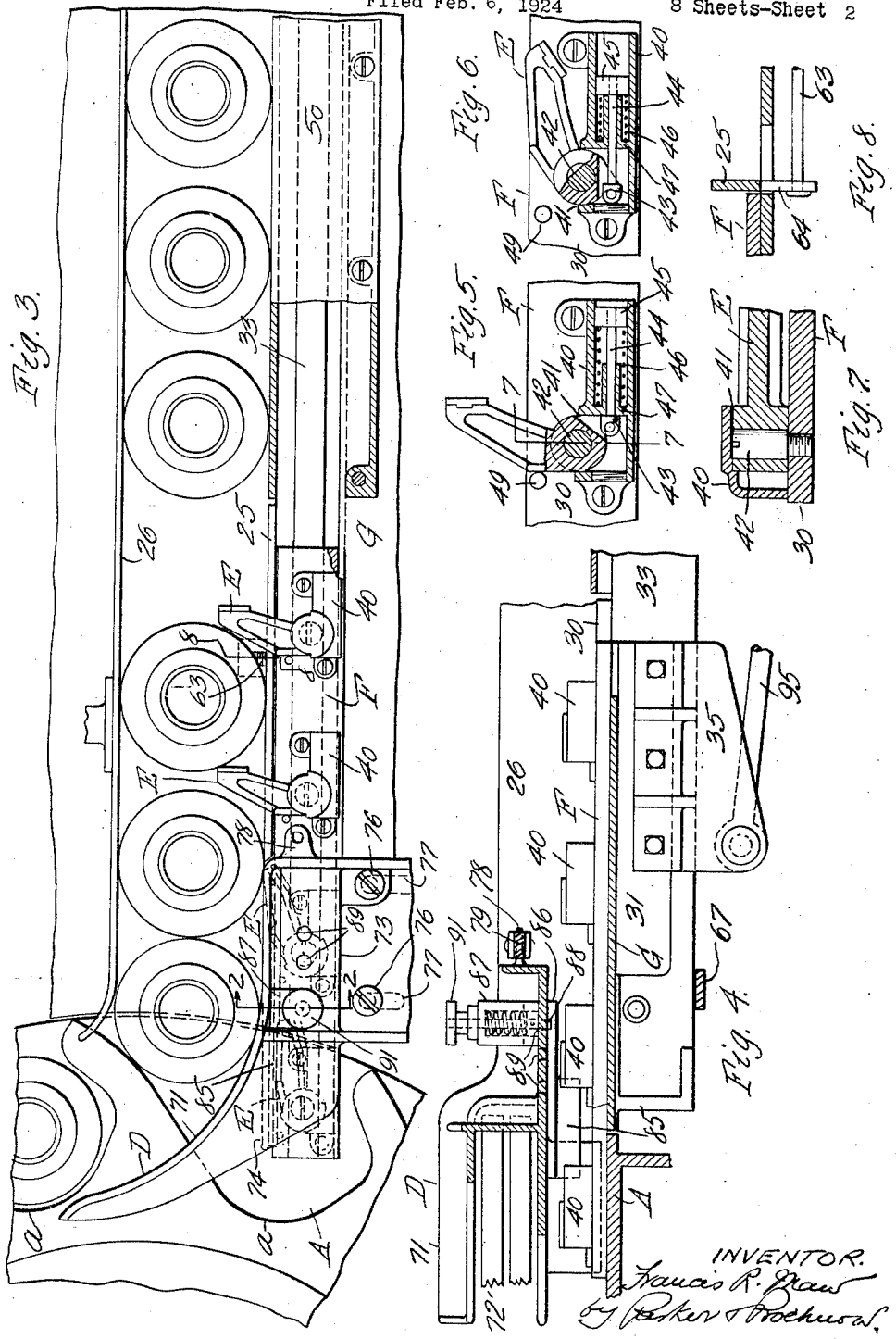

Aug. 7, 1928.
F. R. MAW
1,679,939
BOTTLE ADVANCING MECHANISM
Filed Feb. 6, 1924
8 Sheets-Sheet 3
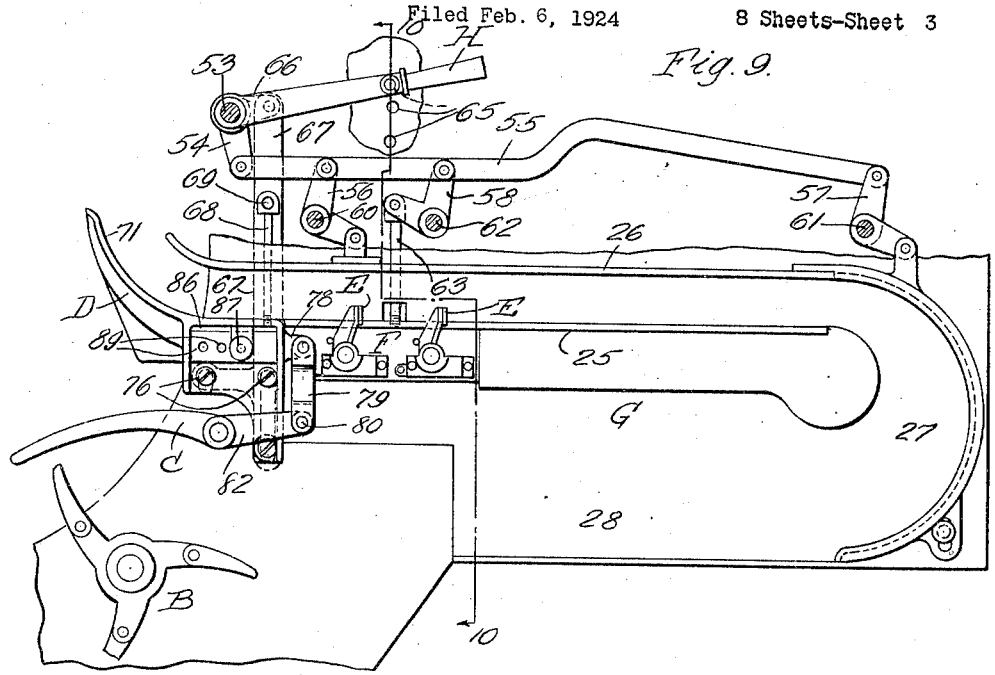
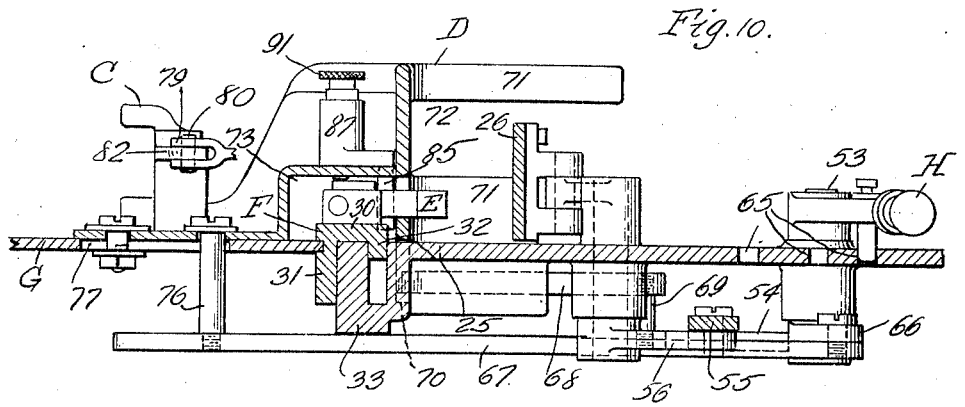
INVENTOR.
Francis R. Maw
by Parker & Brochwow
ATTORNEYS.

Aug. 7, 1928.

F. R. MAW 1,679,939

BOTTLE ADVANCING MECHANISM

Filed Feb. 6, 1924

INVENTOR.
Francis R. Maw
by Parker & Prochnow.
ATTORNEYS.

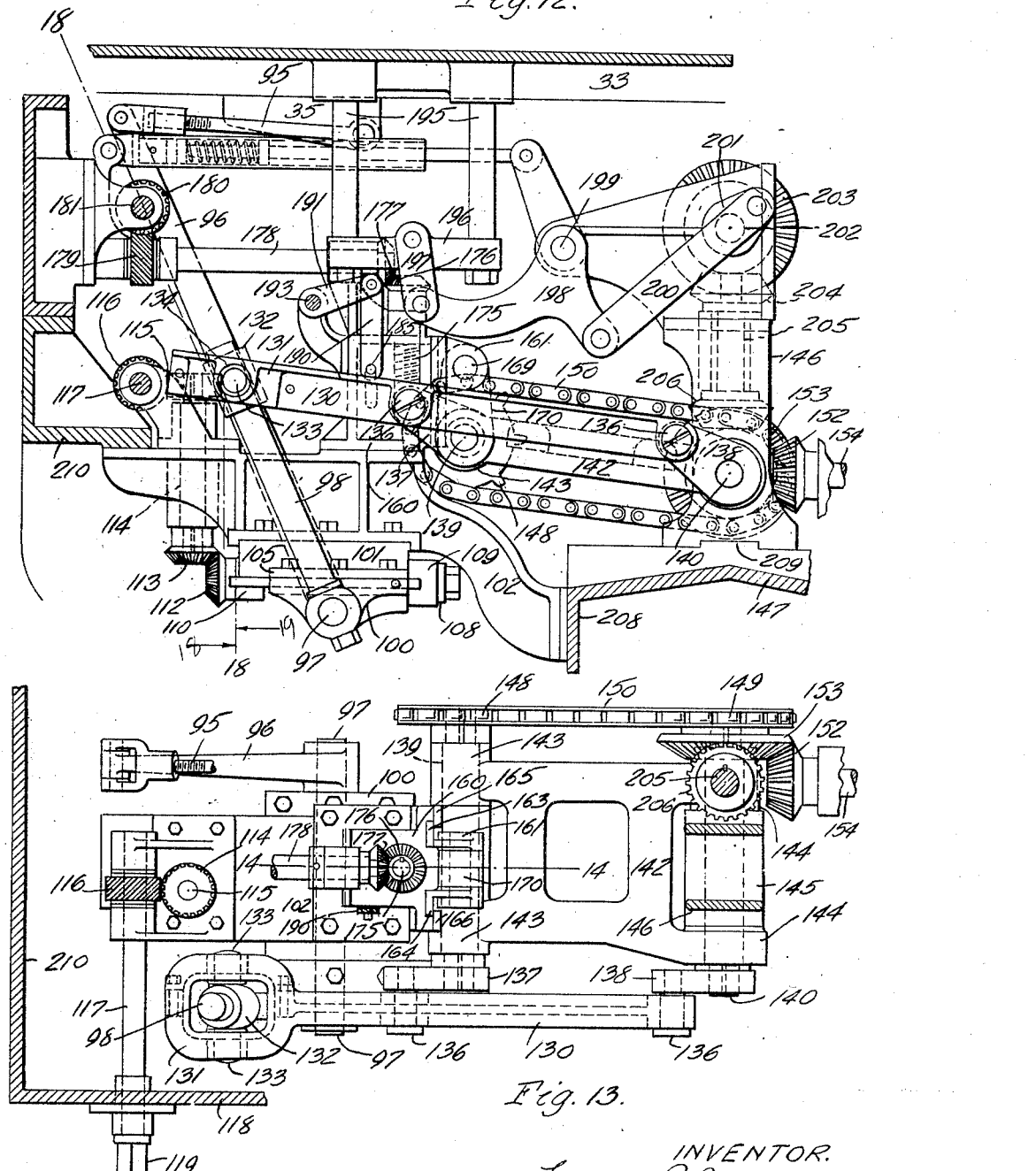

Aug. 7, 1928.
F. R. MAW
1,679,939
BOTTLE ADVANCING MECHANISM
Filed Feb. 6, 1924     8 Sheets-Sheet 6
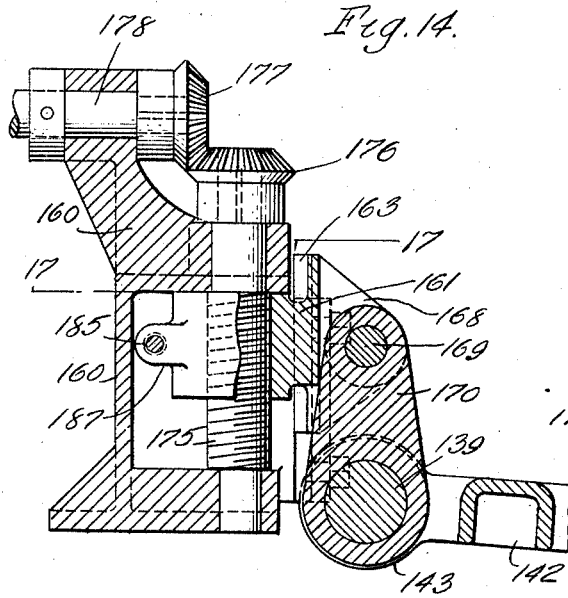
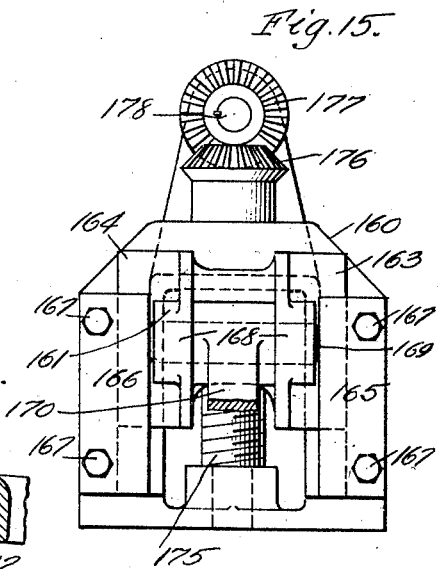
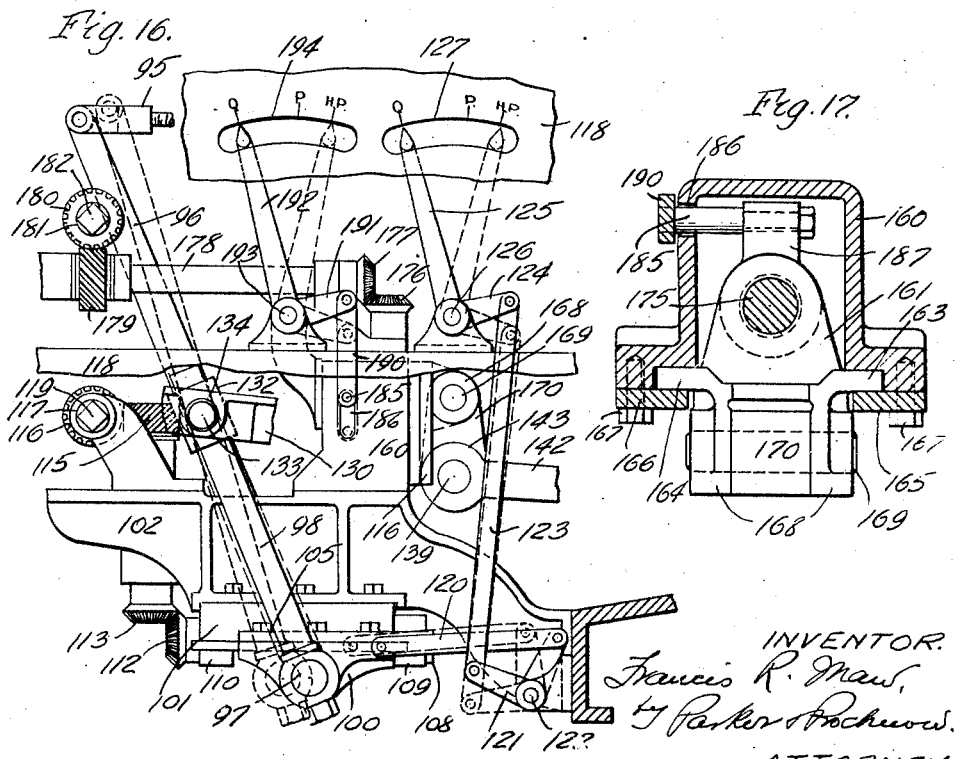

Aug. 7, 1928.

F. R. MAW 1,679,939

BOTTLE ADVANCING MECHANISM

Filed Feb. 6, 1924        8 Sheets-Sheet 8

INVENTOR.
Francis R. Maw
by Parker & Brochwow,
ATTORNEYS.

Patented Aug. 7, 1928.

1,679,939

UNITED STATES PATENT OFFICE.

FRANCIS R. MAW, OF BUFFALO, NEW YORK, ASSIGNOR TO RICE & ADAMS CORPORATION, OF BUFFALO, NEW YORK.

BOTTLE-ADVANCING MECHANISM.

Application filed February 6, 1924. Serial No. 690,996.

This invention relates to bottle feed or advancing mechanisms for moving the bottles from one part to another of a machine, for example, from the filling mechanism to the capping mechanism of a bottle filling and capping machine.

The objects of this invention are to provide a bottle advancing mechanism of improved construction, including a reciprocatory feed member which is readily adjustable to operate on bottles of different sizes and to compensate for wear in the parts of the mechanism; also to provide guide means for the bottles which can be readily adjusted to adapt the machine to operate on bottles of different sizes; also to provide means of improved construction for causing the fingers of the feed member to cooperate with bottles of different sizes; also to improve the construction of bottle advancing mechanisms in other respects hereinafter specified.

In the accompanying drawings:

Fig. 1 is a fragmentary top plan view, partly in section, of a bottle filling and capping machine provided with a bottle advancing mechanism embodying the invention.

Fig. 2 is a transverse sectional elevation thereof on an enlarged scale, on line 2—2, Fig. 3.

Fig. 3 is a fragmentary top plan view thereof, partly in section, on an enlarged scale, showing the path of the bottles from the rotary table to the reciprocatory conveyor.

Fig. 4 is a sectional elevation thereof showing a reciprocatory feed bar carriage which forms a part of the reciprocating conveyor, and a deflector for guiding the bottles from the rotary table to the conveyor.

Figs. 5 and 6 are fragmentary sectional plan views thereof showing one of the spring-actuated bottle-engaging fingers of the feed bar in two different positions.

Fig. 7 is a fragmentary transverse section thereof, on line 7—7, Fig. 5.

Fig. 8 is a fragmentary sectional elevation of a part of the adjusting means for one of the gage bars, on line 8—8, Fig. 3.

Fig. 9 is a fragmentary top plan view, similar to Fig. 1, but showing some of the parts in different positions.

Fig. 10 is a sectional elevation thereof on an enlarged scale, on line 10—10, Fig. 9.

Fig. 12 is a similar sectional elevation, showing some of the parts of the mechanism in different positions.

Fig. 13 is a fragmentary plan view thereof, partly in section.

Fig. 14 is a fragmentary sectional elevation thereof on line 14—14, Fig. 13, showing a part of the mechanism for adjusting the machine to operate on bottles of different sizes.

Fig. 15 is a side elevation of the structure shown in Fig. 14, partly broken away to more clearly disclose the parts.

Fig. 16 is a fragmentary rear elevation, partly in section, showing part of the adjusting and indicating mechanism for adapting the machine to operate on bottles of different sizes.

Fig. 17 is a fragmentary sectional plan view thereof on line 17—17, Fig. 14.

Figure 18:
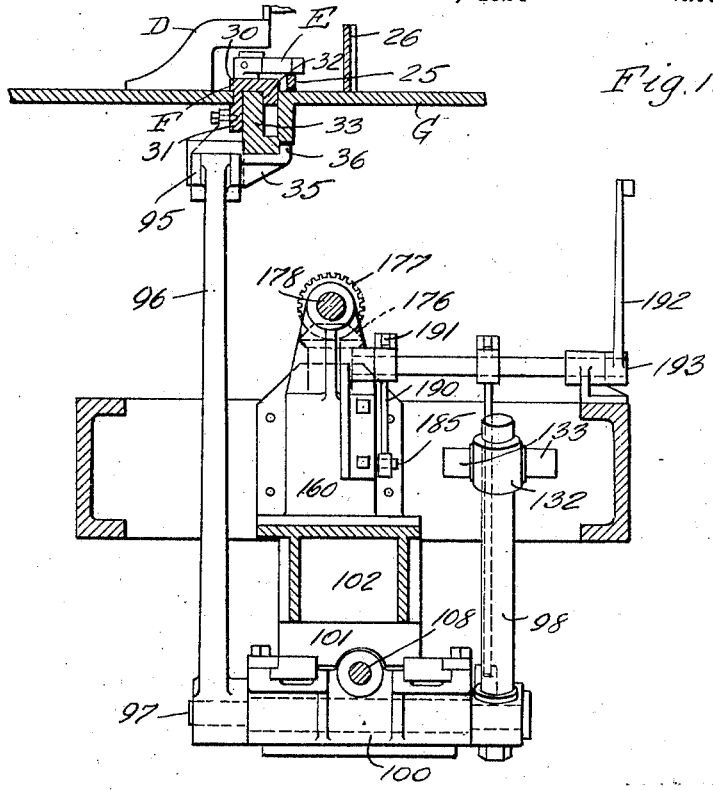
Figure 19:
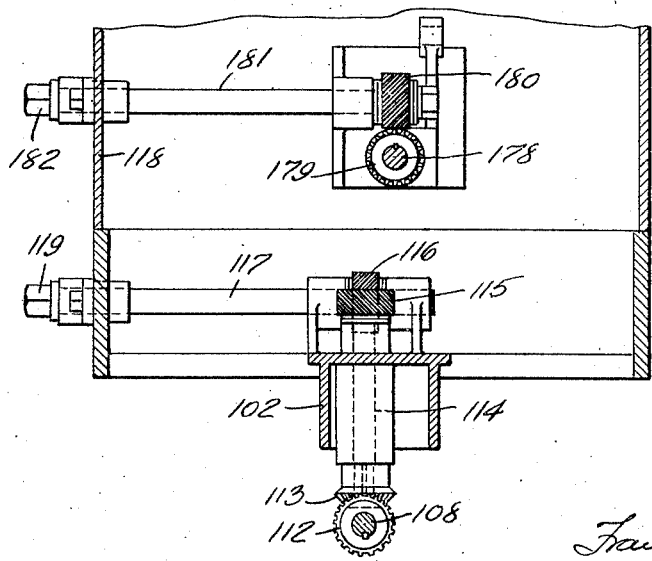

Fig. 18 is a fragmentary sectional end elevation thereof, on line 18—18, Fig. 12, looking in the direction indicated by the arrows 18, and Fig. 19 is a section on the same line looking in the opposite direction, as indicated by the arrows 19.

Figure 11:
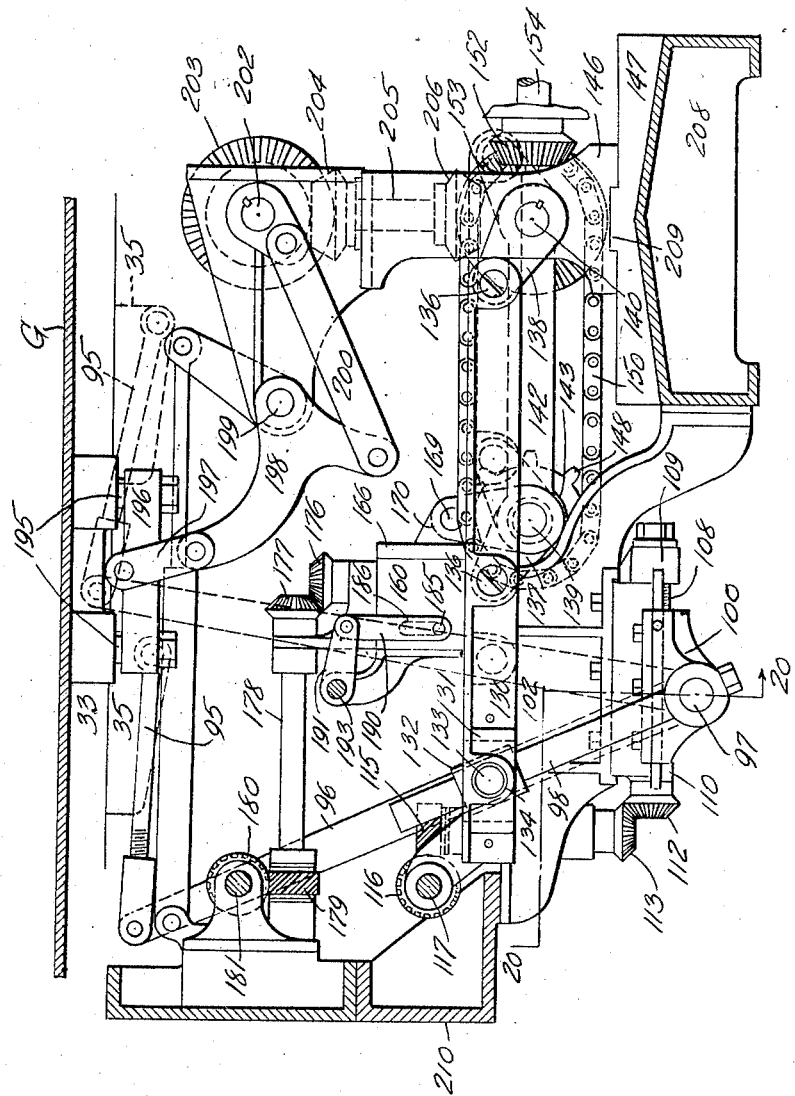
Fig. 11 is a sectional elevation on an enlarged scale, of a portion of the reciprocating mechanism.
Figure 20:
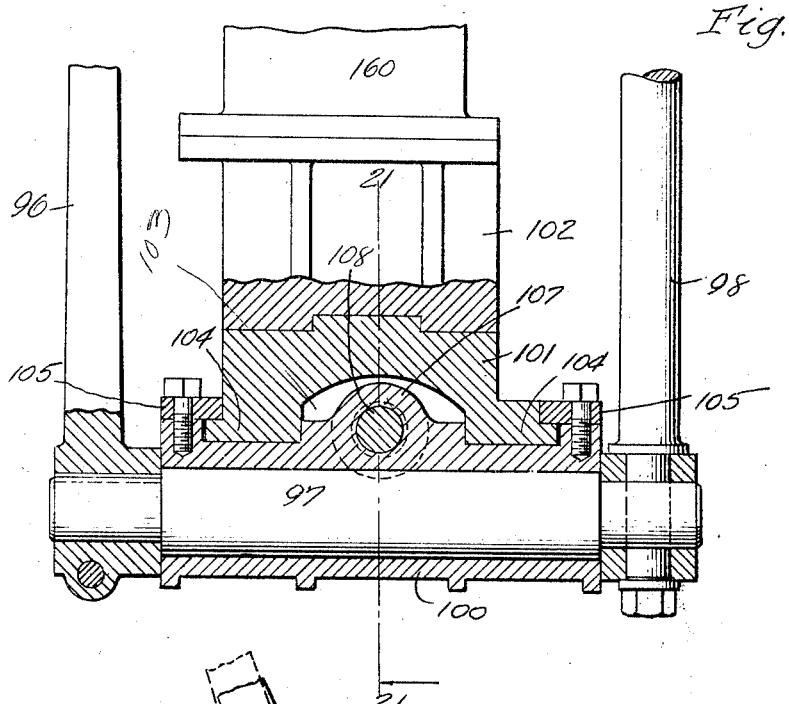

Fig. 20 is a fragmentary transverse sectional elevation thereof, on line 20—20, Fig. 11.

Figure 21:
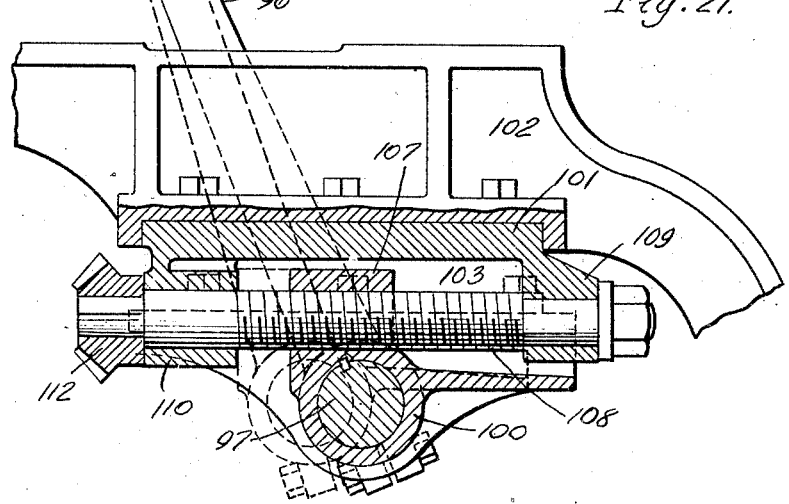

Fig. 21 is a fragmentary side elevation thereof, partly in section, on line 21—21, Fig. 20.

The mechanism embodying my invention, as shown in the accompanying drawings, may be used in connection with any machine in which bottles, cans or the like are moved from one part of the machine to another part. The mechanism is particularly adaptable for use in connection with the handling of milk bottles, since in machines of this kind it is necessary to change frequently from one size of bottles to another. It will be understood that while the mechanism is described as adapted particularly for use in connection with milk bottles, it is not thereby intended to limit the invention to such use only. The drawings show the mechanism applied to a machine for filling the milk into the bottles and then capping the bottles, such, for example, as is shown in my copending application No. 587,271, filed September 11, 1922.

Referring to Fig. 1 of the drawings, A represents a rotary bottle-receiving table having a plurality of pockets or recesses $a$ into which the bottles may be inserted by means of a rotary sweep wheel or positioning member B, which receives the bottles from a table or other suitable source $b$ and which is so timed as to position a bottle in each of the bottle-receiving pockets of the rotary table. The bottle filling devices are not shown in the drawings of this application, but it will be understood that the bottles are filled while on the rotary table A, as shown in my before-mentioned application. The positioning of the bottles on the table by the sweep wheel B is effected in conjunction with a guide finger or curved bar C, which is adjustable in order to enable the sweep wheel B to operate on bottles of different sizes. The bottles are discharged from the rotary table A by means of a curved deflector D which extends into the path of movement of the bottles on the rotary table and causes the bottles to move into a straight path between a pair of oppositely disposed adjustable guide bars or plates 25 and 26. The bottles upon reaching the straight path between the guide bars are acted upon by a reciprocating conveyor mechanism which serves the two-fold purpose of advancing the bottles to a capping mechanism arranged in operative relation to the straight path, and which is not shown in these drawings, and of positioning a plurality of bottles in such a manner that they will be correctly presented to the capping mechanism so that the capping mechanism may act upon a plurality of bottles at one time. After being acted upon by the capping mechanism, the bottles pass over a semi-circular path 27 and are placed upon a platform 28 on the front part of the machine, where they may be removed by hand or by any other suitable means.

The bottles, after entering between the guide plates 25 and 26, are engaged by means of fingers E mounted on a reciprocating feed member or bar F and are carried along the straight path between the two guide plates. This feed bar may be of any suitable or desired construction, that shown in the drawings, see particularly Figs. 10 and 18, has a horizontal, upper portion 30 having depending webs or flanges 31 and 32 engaging opposite faces of a guide rib or track 33 formed on a table G which is suitably mounted on the frame of the machine. This table is provided with a groove on one side of the guide rib 33 into which the flange 32 extends and the opposite flange 31 extends through a slot in the table. The flange 31 has secured thereto a bracket 35, see particularly Figs. 4 and 18, which has a laterally disposed web or extension 36 engaging the underside of the rib 33 and which helps to guide the feed bar in its reciprocatory movement. The feed bar F is adapted to be reciprocated from a position adjacent to the rotary table A to a position nearer to the other end of the straight path between the guide bars 25 and 26, and when in a position adjacent to the rotary table, the fingers E of the feed bar arrange themselves one behind each of the filled bottles, and on the return stroke of the feed bar, the fingers carry the bottles to the capping position, an additional finger E' being preferably provided in advance of the three fingers E used for feeding the filled bottles which is adapted to engage the bottles which have already been capped to push the same beyond the capping mechanism. By forming the reciprocating feed bar so that the same can carry a plurality of bottles at one time, for example, three bottles, as in the construction shown in the drawings, the movement of the feed bar need not be very rapid, so that no liquid is spilled from the bottles while being moved by the feed bar, and at the same time the capacity of the machine may be increased beyond that of machines now used without materially increasing the size of the machine.

The bottle-engaging fingers E may be of any suitable construction such that they may be deflected out of the path of movement of the bottles when the feed bar is moving toward the rotary table A. The fingers shown in the darwings, see particularly Figs. 3-7, cooperate with spring mechanisms arranged in housings 40 which are secured by means of screws, or otherwise, in spaced relation on the feed bar F. At one side of each housing and facing toward the path of the bottles is an aperture 41 through which the finger E extends. The finger is pivoted on a stud 42 secured to the feed bar adjacent to the aperture 41 and the finger also has a lateral lug or hook 43 arranged within the housing and with which one end of a plunger rod 44 is connected. A plunger 45 is secured to the other end of the plunger rod and a coil spring 46 is arranged between the plunger 45 and an inwardly extending wall or part 47 of the housing, so that the spring normally swings the finger into the extended position shown in Fig. 5, but permits the finger to be swung into the position shown in Fig. 6 when passing a bottle. Consequently when the feed bar moves toward a group of bottles which have been discharged from the rotary table, the fingers E are deflected by the bottles until the feed bar has reached the limit of its stroke. The fingers are then returned to their extended positions by the springs 46 and will automatically arrange themselves each behind a bottle. Stop pins 49 are provided for limiting the extent to which the bottle-engaging fingers may be swung by the spring 46. A cover plate 50 is preferably arranged over that portion of the guide rib 33 removed from the rotary table A so as to protect this portion of the guide rib from possible damage due to broken glass or the like. Spring fingers of other suitable construction may be employed, if desired.

Means are provided for moving the bottle guide bars 25 and 26 toward and from each other simultaneously and also at the same time moving and maintaining the deflector D in alinement with the bar 25, and this adjusting mechanism preferably also changes the position of the bottle guide fingers C so that by making a single adjustment all of the parts may be positioned for bottles of a particular size. In the construction shown, these adjusting means include a horizontally swinging hand lever H, see particularly Figs. 1 and 9. One end of this hand lever is fixed on a stud 53 which is pivoted on the table or support G. The lower end of this stud is provided with a fixed arm 54 which is pivotally connected to a connecting link 55 extending lengthwise of the machine underneath the table G. The connecting link 55 is connected to one of the arms of each of three bell crank levers 56, 57 and 58 which are pivoted at 60, 61 and 62, respectively, on the table G. The other arm of two of the bell cranks 56 and 57 are connected to the bottle guide bar 26 and the other arm of the bell crank 58 is pivotally connected to a rod 63, the other end of the rod being connected to a depending finger 64 of the guide bar 25, as shown in Fig. 8. As will be seen by referring to Figs. 1 and 9, a swinging movement of the lever H will move the guide bars 25 and 26 toward or from each other through the medium of the links and bell crank levers described. In the machine shown in the drawings, the table G is provided below the lever H with a plurality of holes 65, three being shown, into which a plunger or other part of the lever H is adapted to enter to hold the lever in different positions, depending upon the size of bottles being acted upon by the machine. Consequently the parts controlled by the lever H may be quickly adjusted for operating on bottles of different sizes, for example, quarts, pints or half pints, by merely shifting the lever H into a position in which a part thereof will enter into one or another of the holes 65.

The deflector D may be of any desired construction, that shown including a bottle-engaging upright wall 71 cut away at its outer or curved part, as shown at 72, to permit the passage therethrough of parts of the rotary table A. The lower portion of the straight part of the bottle-engaging wall 71 is recessed or extended laterally as indicated at 73, to afford free passage beneath the deflector of the feed bar F and the parts mounted thereon. The inner face of the recessed portion 73 is further provided with a depending wall or guide 74 which is adapted to deflect the outer finger E of the feed bar as it passes over the rotary table A, so that it will be held out of the way of bottles coming into the straight passageway until these bottles have been completely removed from the rotary table.

The deflector is preferably mounted on the table or support G by means of screws 76 which pass through slots 77 in the table and into a transverse link 67 of the guide bar adjusting mechanism, this link being pivoted to an arm 66 of the stud 53, so that a limited transverse adjustment of the deflector is permitted, the slots also serving to guide the deflector in its movement. The movement of the bottles from the rotary table A to the table G is assisted by the recesses or guide pockets a on the rotary table, so that these recesses, together with the deflector D, serve to position the bottles on the table G where they may be taken up by the fingers E. In order to prevent the deflector D from binding in the slots in the table when the deflector is moved to its various positions, a second link or bar 68 is connected with the link 67, preferably in such a manner that the second link 68 extends above the link 67, this being done in the construction illustrated by interposing a sleeve or post 69 between the two links. The other end of the link 68 is connected to a depending finger 70 of the deflector D, so that the deflector is moved by the two links simultaneously with the two guide bars and remains substantially in alinement with the guide bar 25.

In order to enable the adjustment of the hand lever H to effect the adjustment of the bottle guide finger C, the following construction is preferably used.

The deflector D is provided with a lateral arm or extension 78 to which a link 79 is pivoted, as shown in Figs. 1, 9 and 10. The other end of this link is connected by means of a pin 80 to an arm 82, forming a part of the bottle guide finger C, so that the movement of the hand lever H is transmitted through the deflector to the arm 82 of the bottle guide finger C.

The deflector D is preferably provided with adjustable means for holding the outermost finger E away from the bottles while the feed bar F is at the outer end of its stroke adjacent to the rotary filling table. It may be necessary when the machine is operating on small bottles, to hold the outermost finger away from the bottles for a longer period than when operating on larger bottles, for the reason that the centers of smaller bottles are closer together in the guideway than those of larger bottles, since without such adjustable means the outer finger may feed two bottles instead of one, and thus fail to aline the bottles with the capping devices. For this purpose, an adjustable finger-retaining bar 85 is provided which is slidably mounted on the deflector D, see particularly Figs. 2, 3 and 4. This adjustable deflector is in the form of an upright plate which extends parallel and adjacent to the fixed depending wall or guide 74 of the deflector beyond the outer edge of the depending wall 74. In the construction shown, this adjustable deflector has a projecting part 86 which extends through a slot in the horizontal offset portion or wall 73 of the deflector. The adjustable deflector may be moved toward and from the rotary filling table by means of a lug or projection 87 extending upwardly from the projecting part 86 and formed integral therewith and the adjustable detector may be held in any adjusted position by means of a pin 88 adapted to engage in any one of the series of holes 89 arranged in the detector D. This pin is preferably pressed into its holding position by means of a spring 90 arranged in the recess or hole in the lug or boss 87 and a knob or handle 91 is formed at the upper end of the pin 88 so as to facilitate the moving of the pin out of a hole in the deflector D. Consequently when the machine is used in connection with small sized bottles the pin 88 is preferably placed in the hole 89 which is furthest removed from the rotary table A, as shown in Fig. 3. When operating on larger bottles, the pin is placed into holes situated nearer to the rotary table. Any other means for holding the adjustable member in a desired position may be employed.

Any capping mechanism which may be used in connection with this machine will consist of a plurality of capping devices which are spaced at definite distances from each other and the capping mechanism itself will be mounted in a fixed position on the machine. Consequently, in order to position bottles of different sizes accurately under the capping devices, so that each bottle will be centered with reference to one of the capping devices, the movement of the feed bar F must be different for different sizes of bottles. The stroke of the feed bar must be greater when operating on the small bottles than when operating on the large bottles, and also the increase in the stroke of the feed bar must be greater toward the bottle filling table A than toward the capping mechanism. Consequently, to adjust the machine for operation on bottles of different sizes, it is necessary to change the length of the stroke of the feed bar and also to adjust the path of movement thereof. The mechanism for accomplishing these results is preferably constructed as follows:

The bracket 35 of the feed bar F is pivotally connected to one end of a link 95, the opposite end of which is pivotally connected to a lever 96 fixed to one end of a shaft 97, see Figs. 11, 12, 13, 20 and 21. This shaft is provided at its other end with an arm 98 also rigidly secured thereto and extending substantially parallel to the rocking lever 96. In order to produce the desired movement of the feed bar F when the machine is operating on different sizes of bottles, the position of the shaft 97 upon which the rocking lever is secured must be changed in such a manner that the lever swings about a different center and also the throw or swinging movement of the lever about the axis of the shaft 97 must be varied.

The adjustment of the shaft 97 to change the point about which the rocking lever 96 swings is preferably effected as follows:

The shaft 97 is suitably journalled in a bearing 100 which is mounted to slide lengthwise of the machine upon a guide member 101, secured on a frame member 102 of the machine. The guide member 101 has a central, longitudinally extending recess 103 into which an extension of the bearing enters, and the guide member is also provided with downwardly and laterally extending bearing portions 104 with which bearing faces on the upper part of the bearing 100 engage. The bearing 100 is held in engagement with the bearing projections 104 of the guide member by means of bars 105, Fig. 20, arranged at opposite sides of the bearings and held in place thereon by means of bolts or the like. The bearing 100 has an upwardly extending lug portion 107 which enters into the longitudinal recess 103 of the guide member 101 and which is provided with a threaded hole through which a threaded rod or shaft 108 extends. The ends of this threaded rod are journalled in downwardly extending bearing portions 109 and 110 of the guide member 101 and consequently by turning the shaft 108, the bearing 100 on which the rock arm 96 is journalled may be moved lengthwise of the machine, as indicated in Figs. 16 and 21. The turning of this shaft to position the bearing 100 may be accomplished by any suitable or desired means. In the construction shown, the end of the shaft 108 is provided with a bevel gear 112 which meshes with a bevel gear 113. The bevel gear 113 is arranged at the lower end of a shaft 114 and a gear 115 is secured to the upper end of this shaft and meshes with a gear 116 mounted on a shaft 117. This latter shaft 117 extends forwardly through a wall or cover plate 118 of the machine and is provided at its front end at 119 with means for engaging with a crank or other device for turning the shaft 117.

Means are preferably provided for indicating when the bearing 100 has been moved into the desired position, these indicating means being particularly desirable for the reason that a number of revolutions of the shaft 117 is necessary in order to effect the desired adjustment of the bearing 100. In the construction shown for this purpose, the bearing 100 has pivotally connected thereto a link 120, the other end of which is connected to one arm of a bell crank lever 121 pivoted at 122 on a fixed part of the frame of the machine. The other arm of the bell crank lever 121 is connected pivotally to one end of a link 123, the other end of which is connected to an arm 124 of an indicating finger 125, the indicating finger being pivoted at 126 on a fixed part of the frame of the machine. The end of the indicating finger is provided with an indicating pointer which preferably extends into a slot 127 formed in the side wall or plate 118 of the machine and graduations or marks are provided on the plate 118 adjacent to the slot 127 to cooperate with the indicating end of the finger 125 to show the various desired positions of the bearing 100. Any other means for indicating the position of the bearing member 100 may be provided, if desired.

The mechanism for adjusting the throw of the swinging lever 96 may be of any suitable or desired kind. In the construction shown in the drawings, this mechanism includes a connecting rod 130, one end of which is connected with the arm 98 secured to the shaft 97 of the swinging lever 96. The end of the connecting rod 130 which is connected with the arm 98 is provided with a looped end portion 131 having an opening through which the arm 98 extends. The arm 98 is provided with a sleeve 132 slidably arranged on the arm 98 and having trunnions or bearing lugs 133 extending laterally from opposite sides thereof. The trunnions or lugs are journalled in bearings 134 formed in the looped end portion 131 of the connecting rod. Consequently, the reciprocation of the connecting rod 130 is transmitted to the arm 98 causing the same to swing, and also the end of the connecting rod may be slid lengthwise on the arm 98 by means of the sleeve 132.

The connecting rod 130 may be actuated to impart an oscillating or swinging movement to the arm 98 in any suitable or desired manner. In the construction shown, the connecting rod is pivotally connected to a pair of crank pins 136 formed on cranks 137 and 138 which are rigidly secured to shafts 139, 140 respectively. The shaft 139 is journalled in the free end of a swinging bearing member or bracket 142, having bearing lugs or projections 143 in which this shaft is journalled. The other end of the bearing bracket 142 is provided with bearing lugs or extensions 144 in which the shaft 140 is journalled. The intermediate portion of the shaft 140 is journalled in a bearing 145 formed in a bearing pedestal 146 which is suitably secured on a part 147 on the frame of the machine. Consequently the crank shaft 140 also acts as a pivot about which the bearing member 142 swings. The two shafts 139 and 140 are provided at the ends thereof opposite to the cranks 137 and 138 with sprocket wheels 148 and 149 which are connected by means of the sprocket chain 150, whereby the two shafts 139 and 140 turn simultaneously and in the same direction. The turning of the two shafts is effected by means of a bevel gear 152 which engages with another bevel gear 153 mounted on the shaft 140. This bevel gear 152 is mounted on the end of a shaft 154 which may be driven by any suitable means, not shown. Other means for imparting a reciprocatory motion to the connecting rod 130 may be employed, if desired.

In order to adjust the throw or travel of the swinging lever 96, and consequently also that of the feed bar F, the position of the pivoted bearing member or bracket 142 is changed by swinging the same about the axis of the shaft 140, and this may be done by any suitable or desired means. In the construction shown, an upright bearing member or housing 160 is rigidly mounted upon the frame member or part 102 of the machine, and a sliding member 161 is vertically movable within the housing 160, see particularly Figs. 11 to 17 inclusive. The vertically slidable member 161 is provided with laterally extending bearing parts 163 and 164 which engage the outer face of the housing 160 and which are slidably held on the outer face of the housing by means of plates 165 and 166 secured to the housing by any suitable means, such as machine screws 167. The outer part of the slidable member 161 is provided with a pair of outwardly extending bearing lugs 168 connected by a pivot pin 169 on which one end of a link 170 is pivoted. The other end of this link 170 is pivoted on the shaft 139 which is journalled in the end of the pivoted bearing member or bracket 142. Consequently, when the slidable member 161 is in its lowest position, the parts will occupy the positions shown in Fig. 11, and when the slidable member is raised, the parts will take the positions shown in Fig. 12, thus decreasing the stroke of the swinging lever 96.

Any suitable means may be provided for adjusting the position of the slidable member 161. In the construction shown for this purpose, a threaded shaft 175 is journalled in the housing member 160 and this shaft engages a correspondingly threaded portion of the slidable member 161. The shaft 175 extends upwardly through the upper wall of the housing 160 and is provided at the upper end with a bevel gear 176 which meshes with a bevel gear 177 arranged on a shaft 178. This shaft is provided with a gear 179 meshing with another gear 180 mounted on a shaft 181 which extends out through the wall 118 of the machine and is provided at its outer end with a part 182 which is formed to cooperate with a crank for turning the shaft. Consequently, by turning the shaft 181 by means of a crank, the vertically slidable member 161 may be moved up or down as desired, to change the position of the connecting rod 130 relatively to the arm 98 of the swinging lever 96.

Means are preferably also provided for indicating the position of the vertically slidable member so that an operator may know when the machine is adjusted for operating on bottles of a particular size. In the construction shown for this purpose, a pin or rod 185 is secured to the slidable member and extends out of the housing 160 through a slot 186 therein, the rod in the construction shown being secured to a lug or extension 187 of the slidable member. The outer end of this rod is connected with the lower end of a link 190, the upper end of which is pivoted to an arm 191 which is rigidly connected to an indicating finger 192, similar to the indicating finger 125 used in connection with the mechanism for changing the pivot of the swinging lever 96, the indicating finger 192 being pivoted at 193 on a fixed bearing secured to the frame of the machine. The end of the finger is visible through a slot 194 in the wall of the machine. Other means for indicating the position of the connecting rod 130 relatively to the arm 98 may be provided, if desired.

It is, of course, desirable that the capping device should be operated in unison with the means for swinging the lever 96, and preferably this movement of the capping device is effected by means of the same mechanism which imparts movement to the swinging lever 96. The capping mechanism is not fully shown on the accompanying drawings, but Figs. 11 and 12 show a pair of vertically movable rods 195 which are intended to actuate the capping devices, and a cross bar 196 is rigidly secured to the lower ends of the rods 195. The capping mechanism is actuated by raising and lowering the rods 195 and for this purpose a link 197 is connected to the cross bar 196. The other end of this link is connected to a bell crank lever 198 pivoted at 199 on a part of the frame of the machine. The bell crank lever is swung about its pivot by means of a link 200 which is connected with a crank 201 secured on a shaft 202. This shaft is driven by means of a bevel gear 203 which meshes with a bevel gear 204 arranged on an upright shaft 205. The lower end of this upright shaft is provided with a bevel gear 206 which meshes with the bevel gear 153, which imparts movement to the connecting rod 130. By means of this construction the capping mechanism is actuated by the same mechanism which actuates the swinging lever 96 and the bottle feed bar F. Other mechanism for accomplishing this result may be used if desired.

Means are preferably provided for mounting the actuating mechanism for actuating the feed bar and capping mechanism on the frame of the machine in such a manner that this mechanism can be removed from the frame so that the mechanism can be assembled before mounting the same on the frame and so that it will be readily removable in case adjustment or repair is necessary. For this purpose the pedestal 146 and the frame member 102 are removably mounted upon a fixed part 208 of the frame of the machine. The fixed frame part 208 is preferably provided with a raised portion or key 209 forming a seat for accurately positioning the pedestal 146 thereon. The pedestal may be secured to the fixed frame part 208 by any suitable means, such as threaded screws or bolts (not shown), and similar means may be provided for securing the frame member 102 to the side of the fixed frame part 208. The frame member 102 is preferably also bolted or otherwise secured to a fixed part 210 of the frame. When it is desired to remove the feed bar actuating mechanism as a unit, the pedestal and the frame part 102 are disconnected from the fixed parts of the frame, the lever 96 is disconnected from the connecting rod 95, and other links and shafts are disconnected to release this mechanism from the frame and other parts of the machine, so that all parts mounted on the pedestal 146 and on the frame member 102 may be removed from the machine as a unit.

The machine described is simple and strong in construction and is quickly adjustable to adapt the machine to operate on bottles of different sizes. The mechanism which is used for adjusting the throw and path of movement of the swinging lever 96 can also be used for compensating for any wear which may take place in the movable parts of the mechanism, since even if the mechanism has received considerable wear, the bottles can always be brought to the correct stopping position by a slight adjustment of the shaft 117. By providing separate mechanisms for adjusting the throw and path of movement of the feed bar, the machine can be easily adjusted to meet various conditions and to compensate for wear or looseness in the parts of the actuating mechanism for the feed bar.

I claim as my invention:

1. The combination of a slidable bottle feed member, a lever connected with said member for actuating the same, a connecting rod for swinging said lever, a pair of cranks for actuating said connecting rod, and means for varying the axis of one of said cranks relatively to the fulcrum of said lever to change the throw of said feed member.

2. The combination of a slidable bottle feed member, a lever connected with said member for actuating the same, a connecting rod connected with said lever for swinging the same, means for actuating said connecting rod, means for changing the connection of said connecting rod with said lever to vary the throw of said feed member, and means for adjusting the fulcrum of said lever to vary the path of movement of said feed member.

3. The combination of a slidable bottle feed member, a lever connected with said member for actuating the same, a connecting rod for swinging said lever, a crank for actuating said connecting rod, a second crank pivotally connected to said connecting rod, means for adjusting the fulcrum of said lever to vary the path of movement of said feed member, and means for varying the axis of said second crank relatively to the fulcrum of said lever to change the throw of said feed member.

4. The combination of a slidable bottle feed member, a lever connected with said member for actuating the same, a connecting rod for swinging said lever, a crank for actuating said connecting rod, an adjustable member on which said lever is fulcrumed whereby the fulcrum of said lever may be changed to vary the path of movement of said feed member, and means for changing the throw of said lever.

5. In a machine for operating on bottles of different sizes, the combination of a movable feed member for the bottles, and adjusting means for varying the path of movement and the extent of movement of said feed member to adjust the machine to operate on bottles of different sizes.

6. In a machine for operating on bottles of different sizes, the combination of a movable feed member for the bottles, mechanism for reciprocating said feed member, means for varying the path of movement of said feed member, and means for varying the throw of said feed member, said means being each adjustable independently of each other.

7. In a machine for operating on bottles of different sizes, the combination of a movable feed member for the bottles, a lever connected with said feed member for reciprocating the same, means for swinging said lever, means for changing the fulcrum of said lever to vary the path of movement of said member, and means for adjusting said lever and said swinging means relatively to each other to vary the throw of said lever.

8. In a machine for operating on bottles of different sizes, the combination of a movable feed member for the bottles, adjusting means for simultaneously varying the path of movement and the extent of movement of said feed member to adjust the machine to operate on bottles of different sizes, a lever connected with said feed member for reciprocating the same, a connecting rod, a pair of cranks for actuating said connecting rod, and a sliding connection between said connecting rod and said lever for swinging the same.

9. In a machine for operating on bottles of different sizes, the combination of a movable feed member for the bottles, spring fingers mounted on said feed member and adapted to spring past said bottles when said feed member moves in one direction and to engage said bottles to remove the same when said member moves in the other direction, and a finger-retaining bar mounted on said machine to hold some of said fingers out of engagement with said bottles until after said feed member has started to move in a direction to feed said bottles.

10. In a machine for operating on bottles of different sizes, the combination of a movable feed member for the bottles, spring fingers mounted on said feed member and adapted to spring past said bottles when said feed member moves in one direction and to engage said bottles to remove the same when said member moves in the other direction, a finger-retaining bar mounted on said machine to hold some of said fingers out of engagement with said bottles until after said feed bar has started to move in a direction to feed said bottles, and means for adjusting the position of the finger-retaining bar in accordance with the sizes of bottles on which the machine is to be operated.

11. In a combined filling and capping machine having a bottle filling mechanism and a capping mechanism, the combination of a guide track for guiding bottles from said filling mechanism to said capping mechanism, said guide track including guide bars adapted to engage opposite sides of the bottles, means for simultaneously adjusting both of said guide bars toward and from each other to adapt the machine to operate on bottles of different sizes, a pivoted finger for guiding bottles into operative position on said filling mechanism and means connected with and actuated by said adjusting means to swing said guide finger on its pivot to adjust the same in accordance with the adjustment of said guide bars.

12. In a combined filling and capping machine having a rotary bottle filling mechanism and a capping mechanism, the combination of a pivoted finger for guiding bottles into operative relation to said bottle filling mechanism, a deflector for moving said bottles from said bottle filling mechanism, a guide track for guiding said bottles from said filling mechanism to said capping mechanism, and means for simultaneously swinging said guide finger on its pivot and adjusting said deflector and said track to adapt the machine to operate on bottles of different sizes.

13. In a combined filling and capping machine having a rotary bottle filling mechanism and a capping mechanism, the combination of a deflector for removing bottles from said rotary filling mechanism, a pair of guide bars between which the bottles are passed after leaving said deflector, and which are disconnected from said deflector and means for simultaneously adjusting said guide bars towards and from each other and for moving said deflector to maintain the same in operative relation to said guide bars to enable the machine to operate on bottles of different sizes.

14. In a combined filling and capping machine having a rotary bottle filling mechanism and a capping mechanism the combination of a finger for guiding bottles into operative relation to said bottle filling mechanism, a deflector for moving said bottles from said bottle filling mechanism, a guide track for guiding said bottles from said filling mechanism to said capping mechanism, a series of links connecting said guide finger, said deflector and said track, and a single lever for shifting all of said links to simultaneously adjust said guide finger, deflector and track to enable the machine to operate on bottles of different sizes.

15. In a combined filling and capping machine having a rotary bottle filling mechanism and a capping mechanism, the combination of a finger for guiding bottles into operative relation to said bottle filling mechanism, a deflector for moving said bottles from said bottle filling mechanism, a guide track for guiding said bottles from said filling mechanism to said capping mechanism, a series of links connecting said guide finger, said deflector and said track, a single lever for shifting all of said links to simultaneously adjust said guide finger, deflector and track to enable the machine to operate on bottles of different sizes, and means on said machine for holding said lever in different predetermined positions depending upon the size of the bottles being operated upon.

16. In a bottle advancing mechanism, the combination of a reciprocatory feed member for advancing the bottles, a lever adapted to swing in a substantially vertical plane and connected with said feed member, and a bearing member in which said lever is pivoted and which is movable substantially horizontally to change the pivot of said lever for adapting the machine to operate on bottles of different sizes.

17. In a bottle advancing mechanism the combination of a reciprocatory bottle feed member, a lever connected therewith for moving said feed member, a bearing in which said lever is pivoted, means for moving said bearing to change the pivot of said lever, and indicating means actuated by the shifting of said bearing for indicating the position of said bearing.

18. In a bottle advancing mechanism the combination of a reciprocatory bottle feed member, a lever connected therewith for moving said feed member, a bearing in which said lever is pivoted, a screw threaded member journalled in said machine and engaging said bearing for moving the same to change the pivot of said lever, and indicating means actuated by the shifting of said bearing for indicating the position of said bearing.

19. In a machine for advancing bottles, the combination of a reciprocatory bottle feed member, a lever connected with said member for reciprocating the same, means engaging said lever to actuate the same, means for adjusting the relative positions of said lever and said actuating means therefor to vary the throw of said lever, and means for indicating the change in throw effected by said adjusting means.

20. The combination of a slidable feed bar adapted to move bottles of different sizes, a connecting rod connected with said feed bar for actuating the same, a pair of cranks with which said connecting rod is connected and which actuate said connecting rod, a swinging frame on which said cranks are pivoted, and means for adjusting the position of said frame to change the relative positions of said connecting rod and said feed bar to change the movement of said feed bar.

21. The combination of a slidable feed bar adapted to move bottles of different sizes, a connecting rod connected with said feed bar for actuating the same, a pair of cranks with which said connecting rod is connected and which actuate said connecting rod, a swinging frame on which said cranks are pivoted, adjusting means for moving said frame into different positions for changing the relative positions of said connecting rod and said feed bar, and indicating means for showing the change in adjustment of said connecting rod relatively to said feed bar.

22. The combination of a slidable feed bar adapted to move bottles of different sizes, a connecting rod connected with said feed bar for actuating the same, a pair of cranks with which said connecting rod is connected and which actuate said connecting rod, a swinging frame on which said cranks are pivoted, a slide adjustable manually, and a link connecting said slide with said swinging frame whereby said connecting rod may be moved into different positions relatively to said feed bar for changing the throw of said feed bar.

23. The combination of a slidable feed bar adapted to move bottles of different sizes, a connecting rod connected with said feed bar for actuating the same, a pair of cranks with which said connecting rod is connected and which actuate said connecting rod, a swinging frame on which said cranks are pivoted, a threaded shaft connected with said swinging frame for changing the position of said frame, said shaft being adjustable by hand to vary the position of said connecting rod relatively to said feed bar.

24. In a bottle advancing mechanism, the combination with a rotary table, of a guide way in which said bottles are moved in a substantially straight line, a deflector extending over said rotary table and adapted to move said bottles into said guideway, a feed member for advancing said bottles in said guide way, and means on said deflector to hold said feed member out of engagement with said bottles until said bottles have moved to predetermined positions on said guideway.

25. In a bottle advancing mechanism, the combination with a rotary table, of a guide way in which said bottles are moved in a substantially straight line, a deflector extending over said rotary table and adapted to move said bottles into said guide way, a feed member for advancing said bottles in said guide way, and means on said deflector to hold said feed member out of engagement with said bottles until the bottles have moved into predetermined positions on said guide way, said means being adjustably mounted on said deflector to enable the machine to operate on bottles of different sizes.

26. In a bottle advancing mechanism, the combination with a rotary table, of a guide way in which said bottles are moved in a substantially straight line, a deflector extending over said rotary table and adapted to move said bottles into said guide way, a feed member for advancing said bottles in said guide way, said deflector being recessed to permit the passage of said feed member, resiliently mounted fingers on said feed member, means adjustably mounted on said deflector to hold said fingers out of engagement with said bottles until said bottles have reached predetermined positions on said guide way, and means for moving said deflector to enable the machine to operate on bottles of different sizes.

27. In a combined filling and capping machine having a rotary bottle filling mechanism and a capping mechanism, the combination of a guide track for guiding bottles to said capping mechanism, a curved deflector for guiding said bottles from said filling mechanism to said track, a fixed pivot on said machine, a finger mounted on said pivot for guiding bottles to said filling mechanism, links connecting said track, said deflector and said finger, and means for shifting said links to adjust said track and deflector to fit different sizes of bottles discharged from said filling mechanism, and for turning said finger on its pivot to adjust the same to correspond with the adjustments of said track and deflector.

28. In a combined filling and capping machine having a rotary bottle filling mechanism and a capping mechanism, the combination of a pair of movable guide bars between which bottles from said filling mechanism are guided to said capping mechanism, a movable deflector for guiding bottles from said filling mechanism to and between said guide bars, a fixed pivot on said machine, a finger mounted thereon and adapted to guide bottles to said capping mechanism, and means for simultaneously adjusting said guide bars towards and from each other and said deflector to correspond to the movements of one of said bars to fit different sizes of bottles leaving said filling mechanism, and also to swing said finger on its pivot to adjust the same to cooperate with bottles of the same size as that for which said guide bars and said deflector are adjusted.

FRANCIS R. MAW.